United States Patent
Desantis et al.

(10) Patent No.: US 9,892,001 B2
(45) Date of Patent: Feb. 13, 2018

(54) CUSTOMIZING BACKUP AND RESTORE OF DATABASES

(71) Applicant: Actian Corporation, Palo Alto, CA (US)

(72) Inventors: Robert P. Desantis, San Jose, CA (US); Velimir Radanovic, San Jose, CA (US); Todd Untrecht, Portola Valley, CA (US)

(73) Assignee: Actian Corporation, Palo Alto, CA (US)

( * ) Notice: Subject to any disclaimer, the term of this patent is extended or adjusted under 35 U.S.C. 154(b) by 420 days.

(21) Appl. No.: 14/266,775

(22) Filed: Apr. 30, 2014

(65) Prior Publication Data
US 2015/0317208 A1    Nov. 5, 2015

(51) Int. Cl.
*G06F 17/30* (2006.01)
*G06F 11/14* (2006.01)

(52) U.S. Cl.
CPC ...... *G06F 11/1451* (2013.01); *G06F 11/1448* (2013.01); *G06F 17/30* (2013.01); *G06F 17/30864* (2013.01); *G06F 17/30997* (2013.01); *G06F 11/1469* (2013.01); *G06F 2201/80* (2013.01)

(58) Field of Classification Search
CPC .......... G06F 17/30864; G06F 11/1451; G06F 11/1448; G06F 17/30997; G06F 11/1453; G06F 11/1471; G06F 11/1474; G06F 17/30575; G06F 17/30088
USPC ....................................................... 707/643
See application file for complete search history.

(56) References Cited

U.S. PATENT DOCUMENTS

| | | | | |
|---|---|---|---|---|
| 6,434,681 | B1* | 8/2002 | Armangau | G06F 11/1466 711/162 |
| 6,549,992 | B1* | 4/2003 | Armangau | G06F 11/1456 707/999.202 |
| 7,162,498 | B2* | 1/2007 | Nomoto | G06F 11/1461 |

(Continued)

FOREIGN PATENT DOCUMENTS

WO    WO 2013/174452 A1    11/2013

OTHER PUBLICATIONS

Mayur Dewaikar, Next Generation Data Protection with Symantec NetBackup, 2009, 13 pages.*

(Continued)

*Primary Examiner* — Noosha Arjomandi
(74) *Attorney, Agent, or Firm* — Fenwick & West LLP (57) ABSTRACT

Backups and restore operations of database are customized by performing partial backups and restores. The database maintains information describing database objects that are backed up by subsequent backup operations. The data set that is backed up by backup operations can be modified by executing alter backup commands. An alter backup command identifies one or more database objects and specifies whether the database object should be excluded or included from backup operations. The alter backup command can specify database objects that do not exist in the database. These objects are included or excluded in accordance with the alter backup command whenever they are created in the database. The alter backup command can associate a criteria with a database object in order for the database object to be included or excluded in accordance with the alter backup command.

23 Claims, 4 Drawing Sheets

(56) References Cited

U.S. PATENT DOCUMENTS

| | | | |
|---|---|---|---|
| 8,032,725 B1* | 10/2011 | Malinowski | G06F 11/004 711/162 |
| 2002/0065999 A1* | 5/2002 | Kikuchi | G06F 11/1469 711/162 |
| 2003/0028736 A1* | 2/2003 | Berkowitz | G06F 11/1451 711/162 |
| 2003/0167380 A1* | 9/2003 | Green | G06F 11/1446 711/136 |
| 2004/0117572 A1* | 6/2004 | Welsh | G06F 11/1451 711/162 |
| 2007/0083355 A1* | 4/2007 | Collins | G06F 3/0605 703/23 |
| 2008/0209444 A1 | 8/2008 | Garrett et al. | |
| 2008/0243466 A1* | 10/2008 | Brunet | G06F 11/1451 703/23 |
| 2010/0049930 A1* | 2/2010 | Pershin | G06F 11/1451 711/162 |
| 2014/0006342 A1 | 1/2014 | Love et al. | |
| 2014/0195491 A1* | 7/2014 | Ma | G06F 17/3007 707/652 |
| 2014/0289202 A1* | 9/2014 | Chan | G06F 9/54 707/652 |
| 2015/0227602 A1* | 8/2015 | Ramu | G06F 17/30575 707/634 |
| 2016/0019117 A1* | 1/2016 | Kumarasamy | G06F 11/1417 707/650 |
| 2016/0050230 A1* | 2/2016 | Chin | H04L 63/1491 726/23 |

OTHER PUBLICATIONS

Solution center, Create daily database backups with unique names in SQL Server, Jun. 2016, 39 pages.*

PCT International Search Report and Written Opinion, PCT Application No. PCT/US15/27386, dated Jul. 31, 2015, 14 pages.

* cited by examiner

CUSTOMIZING BACKUP AND RESTORE OF DATABASES

BACKGROUND

The disclosure relates in general to backup and restore of databases and more specifically to customizing backup and restore of databases.

Databases are often used to store data used by an enterprise. In case of disasters, the database may lose information that is critical to the enterprise. For example, the hard disk on which the database is stored may get corrupted and become unreadable. The data loss can also occur due to human error. For example, a system administrator may perform an operation that either deletes or updates data incorrectly.

Databases typically allow the data stored in the database to be backed up. Furthermore, the database can be restored from a backup of the database. Backups are periodically performed in databases that are constantly updated. In case the database becomes corrupt or there is loss of data for some reason, an earlier version of the database can be restored provided the database was backed up.

However, databases used by several applications can be so large that taking backups and restore can require very large amount of storage and takes very long time to process. As a result, backups of these large databases may not be performed very frequently by system administrators. If database backups are not performed frequently, a restored database may have a much older version of data compared to the data that was lost and significant amount of information may be lost upon restore. As a result conventional backup and restore techniques are incapable of handling the sizes of data encountered in several databases.

SUMMARY

Embodiments allow database systems to perform partial backups and restores of databases storing database objects. In response to a backup command, the database system backs up a first data set comprising one or more database objects. The database system receives an alter backup command that modifies the data set to be backed up by subsequent backup commands. The alter backup command identifies one or more database objects and specifies whether these objects should be included or excluded in subsequent backups. In response to subsequent backup commands, the database system backups up a data set that differs from the first data set in accordance with the alter command.

For example, assume that the first data set backs up a particular database object and the alter backup command specifies that the database object should be excluded from subsequent backups. The database system excludes the database object from subsequent backups. Accordingly, the data sets backed up by subsequent backup commands differ from the first data set since they do not include the database object.

In some embodiments, the backup command identifies one or more database objects that do not exist in the database system. These objects are backed up in accordance with the alter backup command whenever they are created in the database system. For example, the alter backup command may specify that a database object should be included in backups even though the database object does not exist in the database system at the time of execution of the alter backup command. However, the database system includes or excludes this database object in accordance with the alter command, whenever the database object is created in the database system.

In some embodiments, the alter backup command specifies certain criteria for a database object indicating that the database object should be processed in accordance with the alter backup command if the criteria is satisfied. The database system evaluates the criteria during backup operations and includes or excludes the database object in accordance with the alter backup command if the criteria is satisfied. If the criteria associated with the database object is not satisfied, the database system ignores the instruction provided in the alter backup command.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

System Environment

Figure 1:
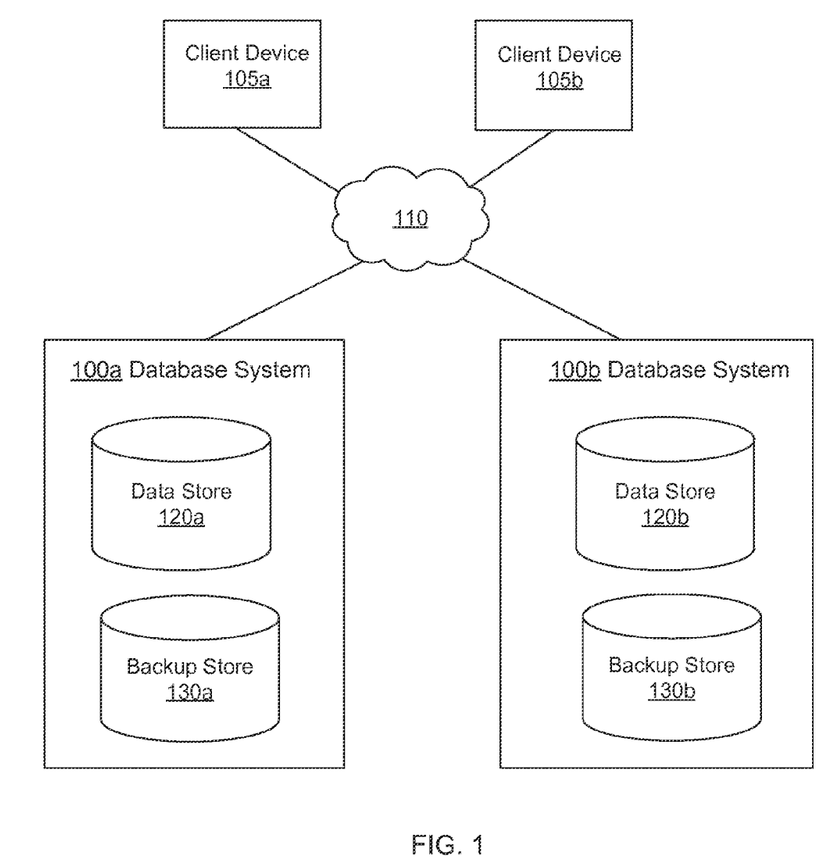
FIG. 1 shows the overall system environment for performing partial backups and restores, in accordance with an embodiment of the invention.

FIG. 1 shows the overall system environment for performing partial backups and restores, in accordance with an embodiment of the invention. The system environment shown in FIG. 1 comprises one or more database systems 100, one or more client devices 105, and a network 110. The client devices 105 interact with the database systems 100 via the network 110. A particular database system 100 may interact with another database system 100 via the network 110 (A letter after a reference numeral, such as "130*a*," indicates that the text refers specifically to the element having that particular reference numeral, while a reference numeral in the text without a following letter, such as "130," refers to any or all of the elements in the figures bearing that reference numeral.)

The database system 100 can be a relational or a non-relational database, for example, an object-oriented database, document-oriented database, hierarchical database, network database, XML database, and so on. The database system 100 stores data in data store 120. In an embodiment, the data stored in the data store 120 is represented in a relational format. Other embodiments may store data in the data store 120 in other (non-relational) formats. For example, the database system 100 may store semi-structured data or unstructured data in the data store 120.

In an embodiment, the database system 100 executes on a server class computer with large memory, storage, and processing capacity compared to devices, for example, client device 105. Users and applications may communicate with the database system 100 by using standard interfaces, for example SQL (structured query language) via ODBC/JDBC (open database connectivity/Java database connectivity).

The database system 100 performs backup of the data stored in data store 120 in response to user requests and stores the output of the backup in a backup store 130. Although FIG. 1 shows the backup store 130 within the database system 100, other configurations may use an external storage for storing the backup output, for example, a tape storage. In other configurations, the backup store 130 may be on a different computing device, for example, another server. Storing the backup output on a separate server from the server executing the database system 100 provides access to the backup data in case there is a complete failure of the server running the database system 100 and the data on the database system 100 cannot be accessed.

The backup output can be transmitted from one database system 100 to another database system 100. For example, the backup output can be transmitted via the network 110 from backup store 130a of database system 100a to backup store 130b of database system 100b. The backup output transmitted to backup store 130b can be restored in the data store 120b of the database system 100b. If the backups of database system 100a are regularly transmitted to database system 100b, the database system 100b can be used as a standby system for use in case of failure of database system 100a. Typically backup operations are scheduled and are executed on a regular basis.

The client devices 105 are computing devices that execute client software, e.g., a web browser or built-in client application, to interact with the database system 100 via a network 110. In an embodiment, users or applications use client device 105 to send database queries via network 110 to a database system 100. The database system 100 executes the database queries and computes a result set based on the received database query. The database system 100 sends the result set back to the client device 105 that requested the information.

A database system 100 maintains one or more database objects that are stored in the data store 120. An example, of a database object is a database table or a database schema. A database table stores data as multiple records (corresponding to rows of the table). A database table may comprise multiple columns, each column representing a particular type of attribute of a record of the table. A database schema is a named set of database objects, for example, a set of database tables. A database system 100 may store one or more schemas, for example, to represent data for different applications. Multiple database objects may be related to each other.

The database system 100 may execute a full backup or an incremental backup. A full backup stores either the entire data of the database or a set of entire database objects stored in the database. An incremental backup stores only changes made to the database (or changes made to the selected database objects) and new database objects added to the database since a previous backup command. The previous backup command may be a full backup command or an incremental backup command. A database administrator may perform a full backup followed by a series of incremental backups. The database may be restored by performing a restore of the full backup, followed by restore of the series of incremental backup outputs. The use of the term backup herein implies either one of full backup or incremental backup unless specifically mentioned.

The database system 100 also supports various types of commands that can be sent by a user. A command may be used to make changes to the configuration of the database system 100 or to request the database system 100 to perform certain action. For example, a user can send a backup/restore command to execute a backup/restore operation on the database system 100. Typically, commands are executed by a privileged user, for example, a database administrator or a system administrator.

Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that interact with a database system. In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system 100 can be another process, for example, a web server that serves queries from remote devices.

The interactions between the client device 105 and the database system 100 are typically performed via a network 110, for example, via the internet. The network 110 enables communications between the client device 105 and the database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

System Architecture

Figure 2:
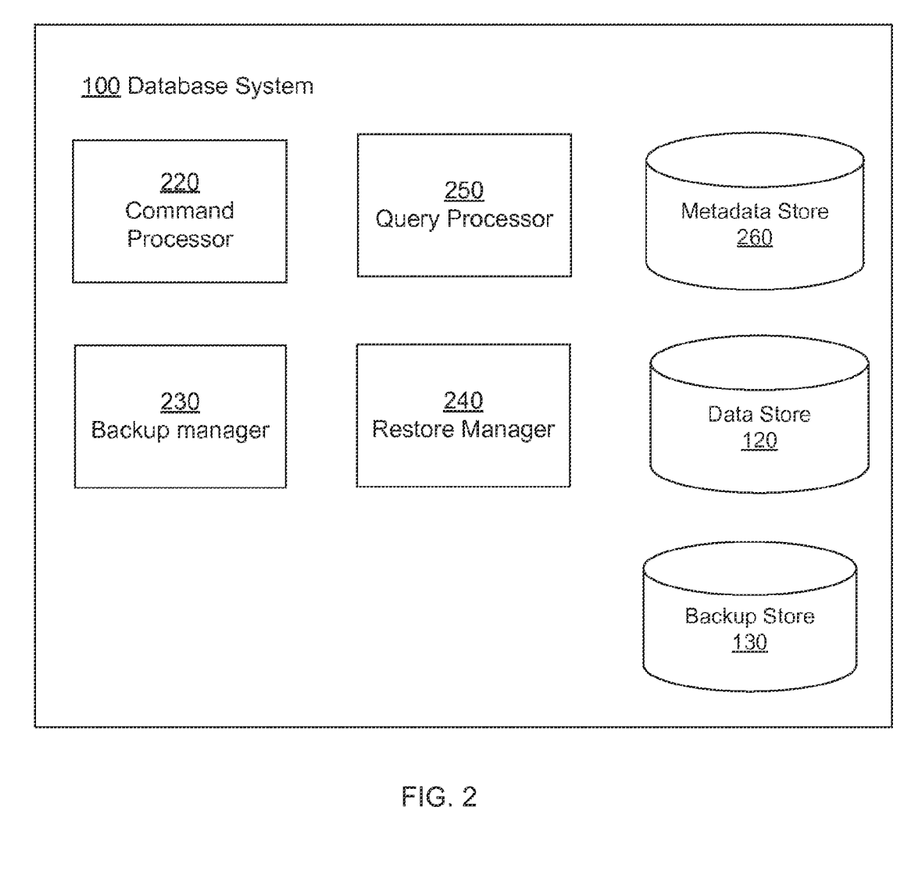
FIG. 2 shows the architecture of database system for performing partial backups and restores, in accordance with an embodiment of the invention.

FIG. 2 shows the architecture of a database system for performing partial backups and restores, in accordance with an embodiment of the invention. The database system 100 comprises a query processor 250, a command processor 220, a metadata store 260, a data store 120, a backup manager 230, and a restore manager 240. In alternative configurations, different and/or additional modules can be included in the system. Furthermore, functionality indicated herein as being performed by a particular module may be performed by other modules than those indicated herein.

The metadata store 260 stores metadata describing the database, for example, various database objects stored in the database including tables, indexes, functions, and so on, and the relations between these objects. The metadata store 260 stores metadata describing the backup data set that is backed up by subsequent backup commands. In an embodiment, the metadata store 260 stores one or more system tables that store the information describing the backup data set. The system table may include records describing various database objects that are either included or excluded from a subsequent backup command.

The command processor 220 executes commands received by the database system 100. A command may provide instructions to the database system 100 to create a database object, for example, to create a database table, a database schema, and so on. The commands request specific actions to be performed by the database system 100. For example, a client device 105 may send a command to the database system 100 to perform a backup. Similarly, a client device 105 may send a command to the database system 100 to perform restore from a backup file. Embodiments of the invention allow a command to alter the data set that is backed up by subsequent backup commands. For example, the command to alter the data set backed up by subsequent backup commands is called the "ALTER BACKUP" command.

The backup manager 230 performs operations related to performing backups of the database. A backup may be a full backup or an incremental backup. The backup manager 230 retrieves the information describing the backup dataset from the metadata store 260 to determine the backup data set to be backed up. The backup manager 230 determines the backup data set and stores it in the backup store 130. In an embodiment, the backup manager 230 generates a backup file that stores the output of the backup command. The backup manager 230 stores the backup file in the backup store 130. Embodiments allow performing a partial backup of the database that stores only a subset of the data set of the database. The subset of the database that is backed up is determined based on alter backup commands executed by the command processor 220. Embodiments allow a partial incremental backup that stores only the changes to the subset of the data set that occurred in the database since a previous backup.

The backup manager 230 ensures that the integrity and consistency of the set of database objects that are backed up is preserved when backups are performed in spite of alter backup commands that may be executed in between the backup commands by the command processor 220. For example, assume that the command processor 220 executes an alter backup command that excludes a particular object (say object X) from backups (for example, by executing "ALTER BACKUP DROP TABLE X"). Subsequently, the backup manager 230 performs one or more incremental backups (with object X excluded). Subsequently, the command processor 220 receives another alter backup command that includes the object X in subsequent backups (for example, by executing "ALTER BACKUP ADD TABLE X"). If the subsequent backup request is to perform an incremental backup of the database, the backup manager 230 obtains a full copy of the object X from the database even though the backup manager 230 may obtain only incremental copies for other database objects being backed up. This is so because the object X was not backed up during the previous incremental backup and performing subsequent incremental backups is likely to leave the object in an inconsistent state. Accordingly, the backup manager 230 ensures the integrity and consistency of the database objects that are backed up.

Furthermore, a database object may include other database objects. For example, a database schema may include one or more database tables. Similarly, a database table may include one or more segments. If the command processor 220 executes an alter backup command that includes or excludes a database object from subsequent backups, and the database object includes a set of other database objects, the backup manager 230 performs backups of the set of database objects in accordance with the alter backup command. For example, assume that the command processor 220 executes an alter backup command that excludes schema S1 comprising tables T1, T2, and T3 from subsequent backups (for example, "ALTER BACKUP DROP SCHEMA S1"). The backup manager 230 ensures that tables T1, T2, and T3 are excluded from subsequent full or incremental backups. For example, if the backup manager 230 receives a request to perform a full backup, the backup manager 230 performs a full backup of the objects included in S1, i.e., T1, T2, and T3. On the other hand, if the backup manager 230 receives a request to perform an incremental backup, the backup manager 230 performs an incremental backup of the objects included in S1, i.e., T1, T2, and T3.

The query processor 250 processes queries received by the database system. Processing a query may comprise parsing the query, generating an execution plan for the query, and executing the query. In an embodiment, one or more database queries may be executed to determine the backup dataset that is being backed up by the backup manager 230.

The restore manager 240 restores the database from a given backup file. The restore manager 240 analyzes the content of a backup file to determine the database objects to be restored from the backup file. The restore manager 240 also determines from the backup file whether the restore is from the output of an incremental backup or the output of a full backup. If the restore is from an output of a full backup, the restore command restores the full content of each database object from the backup file. In some embodiments, if the database object is already present in the database while the restore manager 240 is performing a restore from a full backup, restore manager 240 throws an error or logs a warning message. Alternatively, the restore manager 240 may replace the existing database object with the new database object obtained from the backup file.

Partial Backup

Following is the syntax backup command that support partial backup according to an embodiment.

BACKUP DATABASE database_name
[none|FULL|INCREMENTAL|PARTIAL|PARTIAL INCREMENTAL]
[INTO 'repository_name'|'default']

The backup command provides the option to specify whether the backup is full backup, incremental backup, partial backup, or partial incremental backup. The backup command optionally allows the user to specify a name of a repository ('repository_name') in which the backup output is stored. For example, a storage system file may be a repository in which the output of a backup is stored. An example of usage of the above backup command is "BACKUP DATABASE dbname PARTIAL INCREMENTAL repos1" that requests the database system 100 to backup a database named dbname by performing a partial incremental backup and store the results in repository repos1.

The syntax of a restore command according to an embodiment is as follows.

RESTORE DATABASE database_name
[FROM 'repository_name'|'default']

The restore command specifies the name of the database to which the data is being backed up and the name of a repository ('repository_name') from where the database should be restored. Both backup and restore commands support using a default repository name.

The syntax of an alter backup command according to an embodiment is as follows.

ALTER BACKUP
[ADD|DROP]
<DB_OBJECT_TYPE>
'dbObjectName'*

The alter backup command allows a user to specify whether certain database objects should be included or excluded from subsequent backups. The above command is executed after connecting to a particular database. The above command is specified as a DDL (data definition language) statement. The DB_OBJECT_TYPE specifies the type of database object that is specified by the alter backup command. Examples of database object types specified by the alter backup command include database schemas, database tables, segments of tables (if the database represents a database table as one or more segments), and so on. The dbObjectName refers to specific names of database objects of the type DB_OBJECT_TYPE.

An example of a particular alter backup command is "ALTER BACKUP ADD SCHEMA 'S1', 'S2'". This command specifies that database objects S1 and S2 of type SCHEMA should be included in subsequent executions of backup command. As a result, subsequent backup commands will include S1 and S2 schema objects. If "ALTER BACKUP ADD SCHEMA 'S3', 'S4'" is executed subsequent to execution of the above alter backup command, schemas S3 and S4 will also be included in subsequent backups. Accordingly, the data set stored by a backup command depends on previous executions of the alter backup commands.

Another example of alter backup command is "ALTER BACKUP DROP SCHEMA 'S3'". As a result of execution of this command, schema S3 will be excluded from subsequent backups (both full backups and incremental backups). If the above two alter backup commands that add S1, S2 and S3, S4 were executed before the alter backup commands that drops schema S3, the data set that is backed up by subsequent backup commands would include S1, S2, and S4 based on the execution of these commands.

The alter backup command can specify other types of database objects to be excluded or included from backups, for example, database tables. An example of alter command using database tables is "ALTER BACKUP ADD TABLE 'T1', 'T2'". This backup command specifies that tables T1 and T2 should be included in subsequent backups. Similarly, "ALTER BACKUP DROP TABLE 'T2'" may be executed to exclude table T2 from subsequent backups.

In some embodiments a special token is used to identify all the database objects of a particular type that have not been specified by previously executed of alter backup commands. For example, if a user executes "ALTER BACKUP ADD SCHEMA 'S1' 'S2'", the special token ' ' that represents an empty string refers to all schema objects of the database other than S1 and S2 (as well as other schemas that may have been specified by previously executed alter backup commands). Accordingly, schemas S1, and S2 and all the remaining schema objects of the database will be included in subsequent backups. However, if "ALTER BACKUP DROP SCHEMA 'S3'" is subsequently executed, schema S3 will be excluded from subsequent backups.

In some embodiments, the alter backup command can identify sets of database objects by using regular expressions. For example, assume that the database system 100 includes database objects objectX1, objectX2, objectX3, objectY1, objectY2, and objectY3. The alter backup command can identify a set of objects using regular expressions based on names of the database objects. For example, assuming the above database objects are tables, the command "ALTER BACKUP ADD TABLE objectX*" will include tables objectX1, objectX2, objectX3 in subsequent backups, command "ALTER BACKUP ADD TABLE objectY*" will include objectY1, objectY2, and objectY3 in subsequent backups, and "ALTER BACKUP ADD TABLE object*" will include objects objectX1, objectX2, objectX3, objectY1, objectY2, and objectY3. Other examples of regular expressions that can be specified include regular expression "objectX[1-2]" to identify objectX1 and objectX2, regular expression "object?2" to identify objectX2 and objectY2, and so on.

In an embodiment, an "ALTER BACKUP RESET" command may be executed to reset the previous history of the alter backup commands. Accordingly all database objects identified to be excluded/included by previous alter backup commands are removed from the metadata describing the data set to be backed up. This allows a user to build a new backup data set for being backed up by subsequent backup commands using a new set of alter backup commands.

In an embodiment, an alter backup command specifies database objects that do not exist in the database system. For example, the alter backup command may specify that table Tx should be included in backup although table Tx does not exist in the database system 100. In this situation, the backup manager 230 ignores the reference to the table Tx (or any other type of database object) as long as the database object is absent from the database system 100. However, as soon as the database object specified in created in the database system 100, the backup manager 230 determines whether to exclude or include the database object from subsequent backups based on the alter backup command that was previously executed. As a result, a user can specify whether a database object should be included or excluded from a backup in advance of the creation of the database object.

In some embodiments, the alter backup command allows users to specify an optional database query for a database object that determines a subset of the database object to be excluded/included in subsequent backups. The database query may be an SQL query that selects a subset of data of the database object. For example an alter backup command can specify "ALTER BACKUP ADD TABLE 'T1'SELECT col1, col2 FROM T1'". Accordingly the query 'select col1, col2, from T1' specifies the subset of table T1 that is included in subsequent backups. Accordingly, if table T1 has four columns col1, col2, col3, and col4, the backup manager 230 will include only two columns col1 and col2 in subsequent backups. This ability allows users to skip columns that may be large from being stored in the backup each time the database is backed up.

As another example, the user can specify a subset of records of the table being backed up in the alter backup command. For example, the backup command can specify "ALTER BACKUP ADD TABLE 'T1'SELECT*FROM T1 WHERE T1.client_name='xyz'". Accordingly, the backup manager 230 will include in subsequent backups, rows from table T1 that satisfy the WHERE clause of the database query, i.e., rows for which the value of column 'client_name' of table T1 is 'xyz.' This feature allows users to backup data selectively instead of entire data set of the table or database object included in the backup.

In some embodiments, the alter backup command allows users to specify a criteria that must be satisfied in order to include or exclude the database object in accordance with the alter backup command. For example, the backup command can specify "ALTER BACKUP ADD TABLE 'T1' IF (sysdate( )>'01/12/2014')". Accordingly, backup manager 230 will include table T1 in subsequent backups only if the condition (sysdate( )>'01/12/2014') is satisfied. Assuming that the function call sysdate( ) evaluates to the current date, the backup manager 230 will include table T1 in subsequent backups provided they are executed after the specified date '01/12/2014'.

The alter backup command can also specify whether to include/exclude certain database objects for the duration of certain time interval. For example, the criteria for determining whether a database object is included/excluded can be if the value of sysdate( ) is in a particular range. Similarly, the alter backup command can specify whether to include/exclude certain database objects until a given date or time. For example, the criteria for determining whether a database object is included/excluded can be if the value of sysdate( ) is less than a particular value.

The alter backup command can also specify whether to include/exclude certain database objects if the objects satisfy certain size criteria. For example, the alter backup command can specify that a table should be excluded (or included) from a backup if the size of the table (or the number of rows of the table) exceed(s) (or is below) a threshold value.

Figure 3:
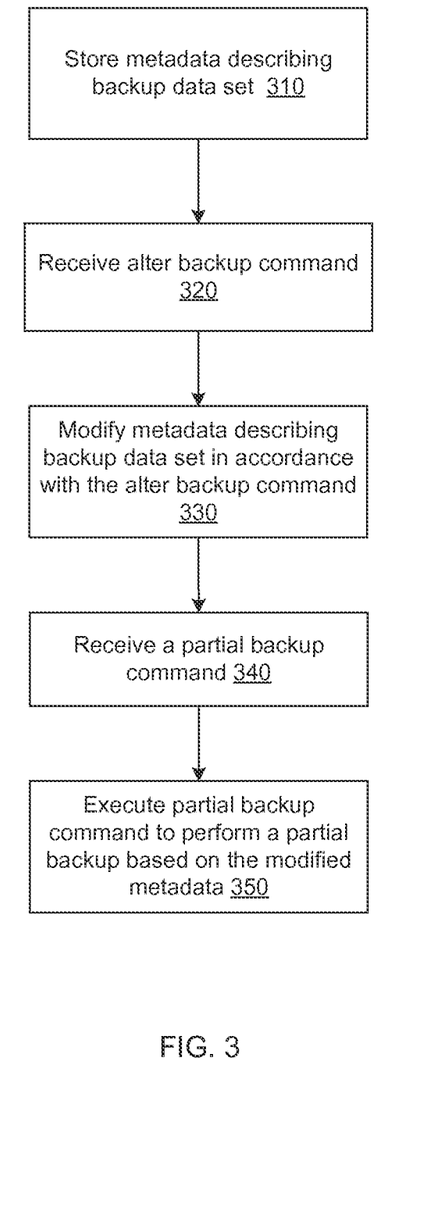
FIG. 3 shows a flowchart illustrating a process for executing an alter backup command, in accordance with an embodiment.

The criteria for determining whether a database objects should be included/excluded may comprise an expression based on a system parameter values that can be set by a user, for example, a database administrator. Accordingly, the database administrator can specify when certain database objects are included/excluded in backups by changing the values of the system parameter. For example, the alter backup command may specify that table T1 should be excluded from backups if, (system_parameter ('optimize_backups')='TRUE'). Accordingly, a system administrator could set the value of parameter 'optimize_backups' to be FALSE by default, thereby causing backup manager 230 to include table T1 in backups by default. However, if needed, the database administrator may modify the value of the parameter 'optimize_backups' to be TRUE, thereby causing the backup manager 230 to exclude table T1 from subsequent backups. Later the database administrator can modify the value of parameter 'optimize_backups' to be FALSE, thereby causing the backup manager 230 to include table T1 in subsequent backups FIG. 3 shows a flowchart illustrating a process for executing an alter backup command, in accordance with an embodiment. The metadata store 260 stores 310 backup metadata describing backup data sets to be backed up using backup commands. The backup metadata may be stored in one or more database tables. The backup metadata may specify one or more database objects that are included/excluded from subsequent backups. For example, the system table describing the backup metadata may identify a specific database object and store a value indicating whether the database object is included or excluded from subsequent backups.

The command processor 220 receives 320 an alter backup command. The command processor 220 parses the alter backup command. The alter backup command identifies one or more database objects and specifies whether each object should be included or excluded from subsequent backups. The command processor 220 identifies the various database objects identified in the alter backup command. The command processor 220 also determines whether the alter backup command specifies inclusion or exclusion of each database objects.

The command processor 220 modifies 330 the backup metadata stored in metadata store 260 based on the information specified in the alter command received. For example, the command processor 220 stores in the backup metadata, information identifying each database object specified in the alter command and information indicating whether the database object should be included or excluded in subsequent backup commands as specified in the alter backup command. If the backup metadata stores information describing a database object based on a previous alter backup command, the execution of the current alter command overwrites the information previously stored in the metadata store 260. For example, based on a previous alter backup command, if the metadata store 260 stores information indicating that a database object should be excluded from subsequent backups and the current alter backup command specifies that the same database object should be included in subsequent backups, the cpms updates the metadata store 260 based on the current (i.e., latest) alter backup command to specify that the database object should be included in subsequent backups.

The command processor 220 subsequently receives 340 a partial backup command. The partial backup command is a backup command that specifies an option indicating the backup is a partial backup. The partial backup command may request a full backup or an incremental backup. For example, a partial backup command may be specified as "BACKUP DATABASE db1 PARTIAL INCREMENTAL" indicating that a partial incremental backup needs to be performed.

The command processor 220 executes 350 the partial backup command received 340 to perform a partial backup based on the metadata stores in the metadata store 260. Accordingly, the command processor 220 executes 350 the partial backup command in accordance with the alter backup command executed as well as other alter backup commands previously executed. The details of the step 350 are further provided in FIG. 4 as follows.

If multiple alter backups are executed specifying the same set of database objects or overlapping sets of database objects, the specification of the last alter backup command is effective in the backup metadata of the metadata store 260. For example, if an alter backup command adds database table t1 to the backup and a subsequent alter backup command drops the database table t1 from the backup, the backup metadata specifies that the table t1 should be excluded from subsequent partial backups. Furthermore, if a subsequent alter backup command adds the table t1 back to the backup data set, the metadata store 260 stores information indicating that the table t1 should be included in subsequent partial backups.

Figure 4:
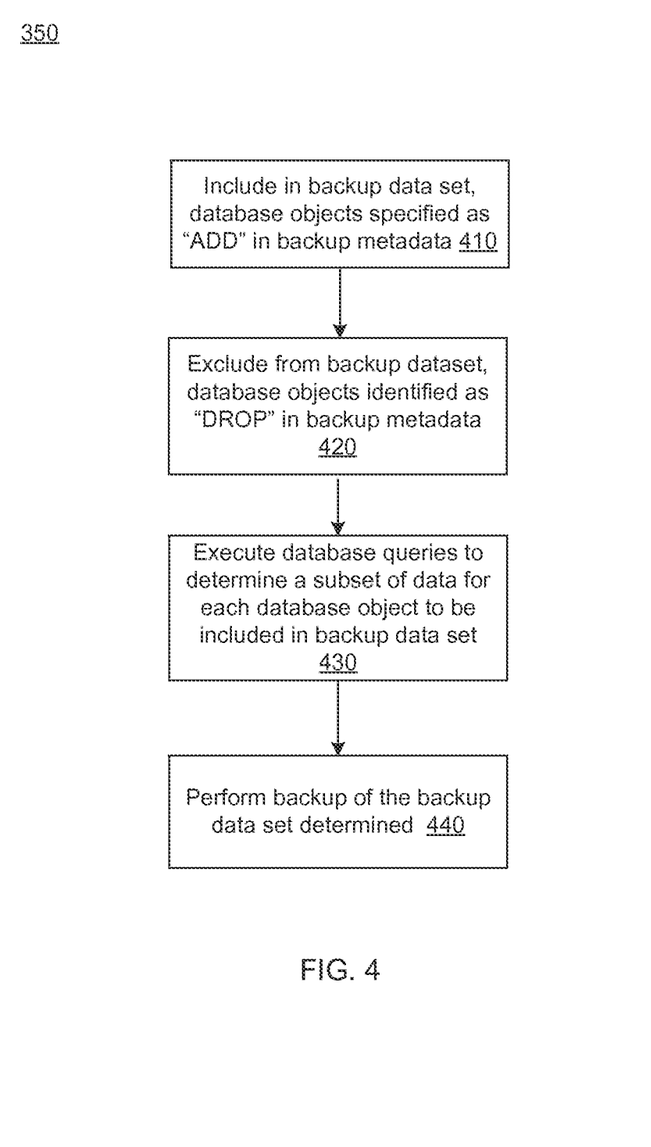
FIG. 4 shows a flowchart illustrating a process for performing a partial backup after executing an alter backup command, in accordance with an embodiment.

FIG. 4 shows a flowchart illustrating a process for performing a partial backup after executing an alter backup command, in accordance with an embodiment. The backup manager 230 performs the steps of the partial backup process in response to receiving 340 the backup command as shown in FIG. 3. The backup manager 230 processes the backup metadata stored in metadata store 260 to determine the database objects to be backed up.

The backup manager 230 determines a set of database objects to be backed up based on the backup metadata stored in the metadata store 260. The backup manager 230 identifies any database objects to be included in the set of database objects according to the backup metadata of the metadata store 260. These include objects specified using the ADD option of the alter backup command. The backup manager 230 includes 410 these database objects in the set of database objects to be backed up. If a alter backup command was executed with the ADD option and with the special token identifying all the remaining database objects, the backup manager 230 includes 410 all the remaining objects to the set of the database objects. However, the backup manager 230 excludes 420 from the set of database objects to be backed up, any database objects identified by the backup metadata for exclusion.

If a database object is specified in the backup metadata stored in the metadata store 260 but does not exist in the database, the backup manager 230 ignores the database object. As a result, if the database object gets created when the backup manager 230 executes the backup command, the backup manager 230 considers the database object based on the instructions in the backup metadata. Accordingly, database objects specified by the alter backup commands that do not exist when the alter command is executed get processed appropriately (in accordance with the alter backup command) whenever they are created in the database.

The backup manager 230 checks if a database object specified in the backup metadata is associated with criteria specifying when the alter backup semantics should become effective. If the backup manager 230 determines that a criteria is specified with a database object, the backup manager 230 evaluates the criteria to determine whether the database object should be included/excluded from the backup in accordance with the alter backup command. If the backup manager 230 criteria is satisfied, for example, the condition of the criterion evaluates to a true value, the backup manager 230 exclude/includes the database object in accordance with the backup metadata. However if backup manager 230 determines that the criteria is not satisfied, the backup manager 230 ignores the specification of the backup instructions as per the backup metadata. For example, if the backup metadata specifies that a database object should be included in the backup, if a particular condition is true, and the condition evaluates to false, the backup manager 230 will not include the database object in the backup (assuming that the database objects was not required to be included in the backup for other reasons, for example, other alter backup commands).

The backup manager 230 checks if any of the database objects to be included/excluded are associated with database queries specifying the subset of data of the database object to be included/excluded. The backup manager 230 invokes the query processor 250 to execute 430 these queries so as to determine the complete data set that needs to be backed up. The backup manager 230 performs 440 the backup of the data set that is identified.

The restore manager 240 performs partial restore process based on a repository created by a backup process. The restore command specifies a name identifying a repository storing the output of a backup. The repository stores information describing the dataset that was backed up by the corresponding backup. For example, the repository identifies the database objects that were backed up. The restore operation determines whether the request to restore is for a full or incremental backup. The restore operation restores the database objects identified by the backup repository.

In one embodiment the techniques disclosed herein are implemented using a system that is separate from the database system. For example, the processes described herein may be implemented using an application or a system running on a server separate from the database. Accordingly, the system executing the processes described herein (for example, the processes illustrated in FIGS. 3 and 4) receives backup requests and forwards the requests to the target database.

The system also processes alter backup requests and maintains backup metadata based on the requests. In some embodiments, the system stores the backup metadata describing the data sets to be backed up by subsequent backups. In other embodiments, the system stores the metadata in a database but sends appropriate DML (data manipulation language) statements to add/update the metadata in accordance with embodiments of inventions described herein. For example, the system generates appropriate insert/update statements to maintain the metadata tables storing the backup metadata information.

The system retrieves the backup metadata information from the database storing the metadata and identifies the backup dataset that needs to be backed up by the database. The system sends information describing the appropriate backup dataset to the database system for execution. For example, the system may send a backup command listing the database objects to be backed up in response to a backup command.

ALTERNATIVE APPLICATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for performing backup of a database, the method comprising:
   maintaining a database system storing a plurality of database objects;
   receiving, by the database system, a first backup command;
   executing the first backup command, comprising backing up a set of database objects;
   receiving an alter backup command identifying a database object and specifying that the identified database object be added to database objects backed up by subsequent backup commands, the alter backup command specifying a criteria;
   executing the alter backup command;
   receiving a second backup command responsive to executing the alter backup command, wherein the second backup command specifies an incremental backup; and
   executing the second backup command, comprising:
      evaluating the criteria to determine whether the criteria is satisfied;
      responsive to determining that the criteria is satisfied, modifying the set of database objects to include the identified database object; and
      backing up the modified set of database objects, wherein the data backed up by the second backup command comprises changes to one or more database objects that were backed up by the first backup command and a full copy of the identified database object.

2. The computer-implemented method of claim 1, further comprising:
   maintaining a backup metadata describing database objects to be backed up by subsequent backup commands; and
   responsive to receiving the alter backup command, modifying the backup metadata, the modifying comprising:
      storing information describing the identified database object in the alter backup command, and
      storing information indicating that the identified database object is added to subsequent backups.

3. The computer-implemented method of claim 1, wherein the identified database object is one of: a database schema comprising one or more database tables, a database table, or a segment of a database table.

4. The computer-implemented method of claim 1, wherein the alter backup command further specifies a database query associated with the identified database object, the database query specifying a subset of data of the identified database object to be added to subsequent backups in accordance with the alter backup command.

5. The computer-implemented method of claim 1, wherein the database object identified in the alter backup command is a database table, and the alter backup command specifies a database query comprising a where clause that specifies a subset of records of the database table to be included in subsequent backups.

6. The computer-implemented method of claim 1, wherein the identified database object is a database table, and the alter backup command specifies a database query comprising a select clause that specifies a subset of columns of the database table to be included in subsequent backups.

7. The computer-implemented method of claim 1, wherein the identified database object is not available in the database, the method further comprising:
   receiving a create command to create the identified database object;
   creating the identified database object based on the create command; and
   adding the identified database object in accordance with the alter backup command for subsequent backup commands.

8. The computer-implemented method of claim 1, wherein the alter backup command specifies a special token to refer to all remaining database objects of a particular type that have not been identified in previous alter backup commands.

9. The computer-implemented method of claim 1, further comprising:
   receiving a restore command identifying an output of a previous backup command; and
   restoring the database to conform to the output of the previous backup command.

10. The computer-implemented method of claim 1, wherein the alter backup command is a first alter backup command, and the set of database objects is a first set of database objects, further comprising:
    receiving a second alter backup command;
    receiving a third backup command responsive to executing the second alter backup command; and
    executing the third backup command, comprising, backing up a third set of database objects, wherein the third set of database objects differs from the first set of database objects in accordance with the first alter backup command and the second alter backup command.

11. The computer-implemented method of claim 10, wherein the third set of database objects differs from the modified set of database objects in accordance with the second alter backup command.

12. The computer-implemented method of claim 1, wherein the identified database object specified by the alter backup command comprises a second set of database objects, wherein executing the second backup command comprises:
    processing the second set of database objects in accordance with the specification for processing the identified database object in the alter backup command.

13. The computer-implemented method of claim 1, wherein the alter backup command identifies one or more database objects by specifying a regular expression based on names of database objects.

14. The method of claim 1, wherein the identified database object is a first database object, the alter backup command identifying a second database object and specifying that the identified database object be deleted from the set of database objects, wherein the modified set of database objects is obtained by excluding the second database object from the set of database objects.

15. The method of claim 1, wherein the criteria specifies a time range, wherein modifying the set of database objects to include the identified database object is performed if the second backup command is executed at a time within the specified time range.

16. The method of claim 1, wherein the criteria specifies a size value, wherein modifying the set of database objects to include the identified database object is performed if the size of the database object satisfies the criteria when the second backup command is executed.

17. A non-transitory computer-readable medium storing instructions for:
- maintaining a database system storing a plurality of database objects;
- receiving, by the database system, a first backup command;
- executing the first backup command, comprising backing up a set of database objects;
- receiving an alter backup command identifying a database object and specifying that the identified database object be added to database objects backed up by subsequent backup commands, the alter backup command specifying a criteria;
- executing the alter backup command;
- receiving a second backup command responsive to executing the alter backup command, wherein the second backup command specifies an incremental backup; and
- executing the subsequent backup command, comprising:
  - evaluating the criteria to determine whether the criteria is satisfied;
  - responsive to determining that the criteria is satisfied, modifying the set of database objects to include the identified database object; and
  - backing up the modified set of database objects, wherein the data backed up by the second backup command comprises changes to one or more database objects that were backed up by the first backup command and a full copy of the identified database object.

18. The non-transitory computer-readable medium of claim 17, further storing instructions for:
- maintaining a backup metadata describing database objects to be backed up by subsequent backup commands; and
- responsive to receiving the alter backup command, modifying the backup metadata, the modifying comprising:
  - storing information describing the identified database object in the alter backup command, and
  - storing information indicating that the identified database object is added to subsequent backups.

19. The non-transitory computer-readable medium of claim 17, wherein the identified database object is not available in the database, wherein the stored instructions further comprise instructions for:
- receiving a create command to create the identified database object;
- creating the identified database object based on the create command; and
- adding the identified database object in accordance with the alter backup command for subsequent backup commands.

20. The non-transitory computer-readable medium of claim 17, wherein the alter backup command is a first alter backup command, wherein the set of database objects is a first set of database objects, wherein the stored instructions further comprise instructions for:
- receiving a second alter backup command;
- receiving a third backup command responsive to executing the second alter backup command; and
- executing the third backup command, comprising, backing up a third set of database objects, wherein the third set of database objects differs from the first set of database objects in accordance with the first alter backup command and the second alter backup command.

21. The non-transitory computer-readable medium of claim 17, wherein the criteria specifies a time range, wherein modifying the set of database objects to include the identified database object is performed if the second backup command is executed at a time within the specified time range.

22. The non-transitory computer-readable medium of claim 17, wherein the criteria specifies a size value, wherein modifying the set of database objects to include the identified database object is performed if the size of the database object satisfies the criteria when the second backup command is executed.

23. A computer-implemented method for performing backup of databases, the method comprising:
- receiving, by a computer, a first backup command for performing a backup of a database;
- sending a request to execute the first backup command, the request identifying a first set of database objects;
- receiving an alter backup command identifying a database object of the database and specifying that the identified database object be added to database objects being backed up by subsequent backup commands, the alter backup command specifying a criteria;
- executing the alter backup command;
- receiving a second backup command to backup the database responsive to executing the alter backup command, wherein the second backup command specifies an incremental backup;
- evaluating the criteria to determine whether the criteria is satisfied;
- responsive to determining that the criteria is satisfied, modifying the set of database objects to include the identified database object; and
- sending a request to execute the second backup command, the request describing the modified set of database objects, wherein the data backed up by the second backup command comprises changes to one or more database objects that were backed up by the first backup command and a full copy of the identified database object.

* * * * *